United States Patent [19]

Hanai et al.

[11] Patent Number: 4,986,603
[45] Date of Patent: Jan. 22, 1991

[54] FRAME OF A VEHICLE SEAT PROVIDED WITH A CHILD SEAT

[75] Inventors: Toshimichi Hanai, Yokosuka; Hideyuki Nagashima, Yokohama; Yasuyuki Fujita, Tokyo, all of Japan

[73] Assignees: Tachi-S Co., Ltd., Tokyo; Nissan Motor Co., Ltd., Yokosuka City, both of Japan

[21] Appl. No.: 362,708

[22] Filed: Jun. 7, 1989

[30] Foreign Application Priority Data

Jun. 17, 1988 [JP] Japan .............................. 63-79476[U]

[51] Int. Cl.$^5$ .......................................... B60R 22/26
[52] U.S. Cl. .................................... 297/468; 297/452
[58] Field of Search ............... 297/468, 482, 467, 452, 297/455

[56] References Cited

U.S. PATENT DOCUMENTS

| | | | |
|---|---|---|---|
| 3,599,254 | 8/1971 | Niewulis | 297/452 X |
| 4,394,050 | 7/1983 | Spooner | 297/468 |
| 4,493,505 | 1/1985 | Yamawaki et al. | 297/452 X |
| 4,598,950 | 7/1986 | Fourrey | 297/452 |
| 4,634,184 | 1/1987 | Hitson | 297/468 |
| 4,722,573 | 2/1988 | Komohara | 297/468 |
| 4,783,122 | 11/1988 | Komohara | 297/468 |

Primary Examiner—Peter A. Aschenbrenner
Attorney, Agent, or Firm—Dilworth & Barrese

[57] ABSTRACT

The present invention discloses an improved rigid structure of a cushion frame provided with a vehicle seat for a child, wherein the seat for a child is mounted at the rear side of a seat back. Further, a seat belt anchor of the seat is firmly fixed to the cushion frame.

To a back frame member of a cushion frame to which a seat belt anchor for a child is fixed, a horizontal portion of a reinforcing member having a large section modulus in the longitudinal direction is firmly fixed. Further a vertical portion of the reinforcing member having a large section modulus in the vertical direction is firmly fixed to the right and left frame members of the cushion frame so as to reinforce the back frame member and the right and left frame members of the cushion frame.

5 Claims, 3 Drawing Sheets

FRAME OF A VEHICLE SEAT PROVIDED WITH A CHILD SEAT

BACKGROUND OF THE INVENTION

The present invention relates to a cushion frame of a vehicle seat provided with a child seat. More particularly, the present invention relates to a structure of frame of a seat cushion, wherein a child seat is mounted at the rear side of a seat back and a seat belt anchor of the child seat is fixed firmly to the cushion frame.

One of the previously-used conventional vehicle seats provided with a child seat by using the rear side of a seat back is illustrated in FIG. 8 and is disclosed, for example, in Japanese patent laid-open publication No. 131335/1985.

According to the aforementioned conventional vehicle seat, a child seat is constituted in a manner such that a stay(not illustrated) of the combination of a seat cushion and head rest for a child (207) is caused to engage an engaging hole(not illustrated) perforated at a lower portion of a seat back (201) under a condition that the seat back is shifted frontwardly (arrow F) as illustrated in FIG. 8 against a seat cushion (203). Arrow (R) denotes the rearward direction in FIG. 8 and reference numeral (205) denotes a movable supporting mechanism in that figure.

Furthermore, each end of seat belts (209,209) is fixed to the seat cushion (207) and also to the rear side of the seat back(201).

It may be noted, however, that since the aforementioned seat belt (209) is merely coupled to the seat back (201) and the seat cushion (207) at two points therebetween, the problem is encountered of eventually having to make the cushion (207) larged-sized to enhance the rigidity thereof, resulting in increase of weight when it is desired to ensure bearing strength of the seat belt (209) satisfactorily.

SUMMARY OF THE INVENTION

With the above in mind, it is an object of the present invention to provide a structure of a cushion frame of a vehicle seat for a child with improved rigidity through simple structure.

The aforementioned object can be attained by a structure of a cushion frame of a vehicle seat provided with a child seat comprising a seat belt anchor of the child seat mounted at the rear side of a seat back being firmly fixed to the cushion frame of a seat cushion. The cushion frame is constituted by a front frame member, a back frame member and right and left frame members concave-shaped in section, with a reinforcing member bent in concave shape being fixed to the back and the right and left frame members of the cushion frame. Both ends of the reinforcing member are constituted to form vertical portions firmly fixed to the right and left frame members and a horizontal portion at a middle of the reinforcing portion members is firmly fixed to an internal surface of the back frame member to which the seat belt anchor is fixed.

Furthermore, the horizontal portion of the reinforcing member is preferably reinforced by squashing two pipes in order to firmly fix an anchor of the seat belt thereto.

Moreover, the right and left, the front and back frame members are preferably formed to have a concave-shaped section to improve the rigidity of the cushion frame.

Because of the aforementioned structure of the cushion frame, the load from the seat belt for a child is dispersed from the back frame member, to which the reinforcing member of said cushion frame is fixed, to both of the right and left frame members, and the back and the right and left frame members of said cushion frame are reinforced by the reinforcing member. Therefore the said frame members do not deform due to the load.

Furthermore, vertical portions formed at both ends of the reinforcing member are firmly fixed to the right and left frame members, thereby preventing a suspended spring stretched accross the cushion frame from contacting with said reinforcing member.

BRIEF DESCRIPTION OF THE DRAWINGS

In the figures.

DESCRIPTION OF THE PREFERRED EMBODIMENTS

Hereinafter, embodiments according to the present invention will be described in detail with reference to the drawings.

Figure 1:
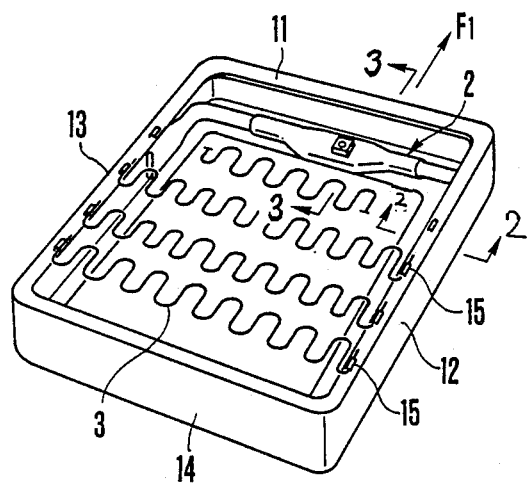
FIG. 1 is a perspective view of one embodiment according to the present invention.
Figure 2:
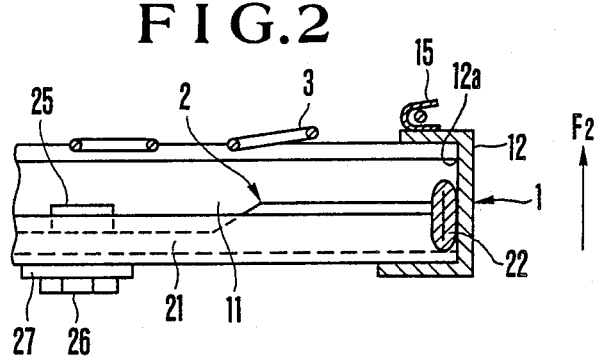
FIG. 2 is a sectional view taken along line 2—2 in FIG. 1.
Figure 3:
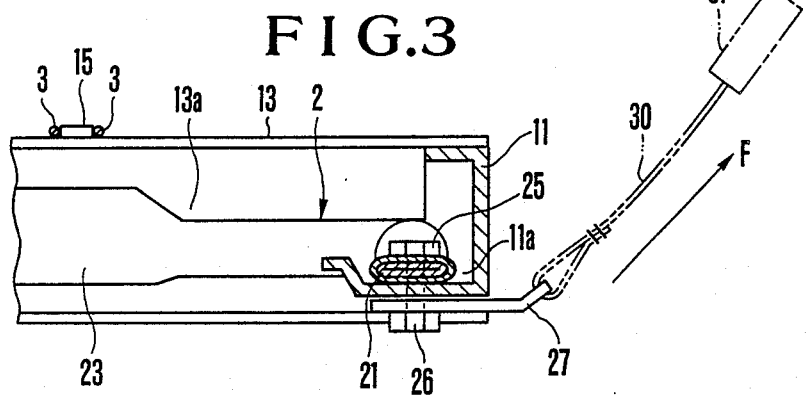
FIG. 3 is a sectional view taken along line 3—3 in FIG. 1.

FIG. 1 to FIG. 3 illustrate the structure of a cushion frame of a vehicle seat provided with a child seat according to the present invention. In the figures, reference numeral (1) denotes a cushion frame. Reference numeral (2) denotes a reinforcing member integrally fixed to the cushion frame (1). Reference numeral (3) denotes a S-typed spring suspendingly stretched across the cushion frame.

The cushion frame (1) is composed of a back frame member (11), a front frame member (14) and the right and left frame members (12) (13) coupling the two frame members (11) (14) thereto. The frame members (11) (12) (13) (14) are each disposed to form a concave-shaped section in such a manner that each open portion of the section face another open portion. The frame members (12) (13) (14) (except for the back frame member (11), e.g. the front frame member (14), may optionally be constituted by employing a metallic pipe. The frame members (11) . . . (14) are each constituted to form a frame by welding.

In the figures, reference numeral (11a) denotes a horizontal internal surface of the back frame member (11) and reference numeral (12a) (13a) denote vertical internal surfaces of the respective right and left frame members (12) (13).

The reinforcing member (2) is integrally welded to the horizontal internal surface (11a) of the back frame member (11) and to the vertical internal surfaces (12a) (13a) of the right and left frame members (12) (13) of the aforementioned cushion frame (1) so as to enhance reinforcing strength of the cushion frame.

Figure 4:
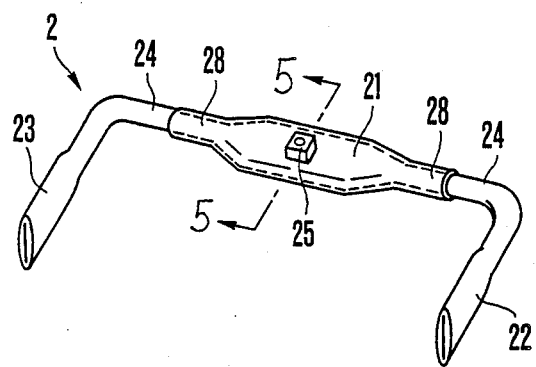
FIG. 4 is a perspective of a reinforcing member.
Figure 5:
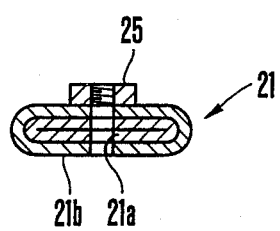
FIG. 5 is a sectional view taken along line 5—5 in FIG. 4.

As illustrated in FIG. 4, the reinforcing member (2) is constituted to form vertical sections (22) (23) by bending a metallic pipe into concave shape. Further both ends of the pipe are squashed into substantially the shape of vertical portions (22) (23) by means of press so as to increase section modulus in the longitudinal direction at both ends of the pipe. Moreover, a middle portion of the pipe is squashed into substantially the shape of a horizontal portion (21) by means of press so as to increase section modulus in the longitudinal direction. Bent portions (24) (24) serve to maintain the section shape of the pipe. The horizontal portion (21) and its neighbouring portion are composed of an inner pipe (21a) constituting the vertical portions (22) (23) and an outer pipe (21b) for inserting the inner pipe (21a) tightly and firmly into the inside thereof. Middle portions of both pipes (21a) (21b) are squashed to constitute the horizontal portion (21) in substantially flat shape. Reinforced portions (28) (28) consisting of the inner pipe (21a) and outer pipe (21b) in the shape of a circular pipe in section which have not been squashed, are arranged at both ends in the longitudinal direction of the horizontal portion (21). At the horizontal portion (21), a through hole is perforated for inserting a clamping bolt therethrough and a nut (25) is welded onto the horizontal internal surface (11a) of the back frame member (11). Furthermore, an anchor for fixation (27) is clamped to the horizontal internal surface (11a) of the back frame member (11) and also to the horizontal portion (21).

By constituting the horizontal portion (21) and reinforced portions (28) (28) by employing the outer pipe (21b) as described above, when impact force in the direction F is applied to a seat belt (30) in FIG. 3, angular moment centering around the bolt (26) is generated to the horizontal portion (21) and the horizontal internal surface (11a) of the back frame member (11) from the seat belt (30) through the anchor (27). As a result, torsion centering around the bolt (26) is caused to generate and at the same time the back frame member (11) of the cushion frame (1) is loaded backwardly (in the direction of $F_1$ in FIG. 1) and further the right and left frame members (12) (13) are loaded upwardly (in the direction of $F_2$ in FIG. 2).

It is noted in connection with the above that the angular moment centering around the bolt (26) may be received by the reinforced portions (28) (28) in the shape of a circular section arranged at both ends of the horizontal portion (21) of the reinforcing member (2) and the load in the direction of $F_1$ applied to the back frame member (11) may be received by the horizontal portion (21) of the reinforcing member (2) integrally fixed to the horizontal internal surface (11a) of the back frame member (11). Furthermore, the load in the direction of $F_2$ applied to the right and left frame members (12) (13) of the cushion frame (1) may be received by the vertical portion (22) of the reinforcing member (2) integrally welded to the vertical internal surfaces (12a) (13a) of the right and left frame member having large section modulus in the same direction. Therefore, there is no fear that the cushion frame (1) is caused to deform owing to impact force generating from the seat belt (30).

The S-typed springs (3) (3) . . . are latched at both ends of clamps (15) (15) and welded to each top face of the right and left frame members (12) (13).

Figure 6:
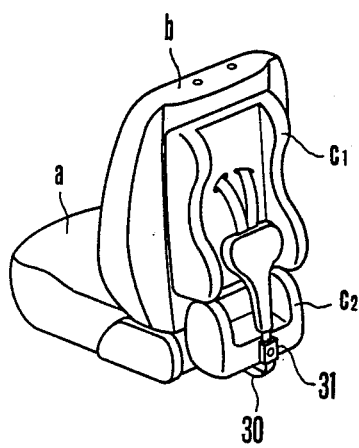
FIG. 6 is a perspective view of a vehicle seat provided with a child seat according to the present invention.
Figure 7:
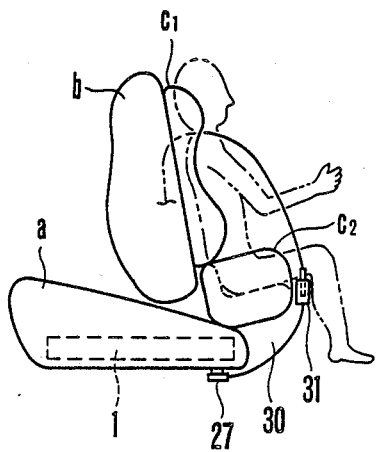
FIG. 7 is a side view thereof.
Figure 8:
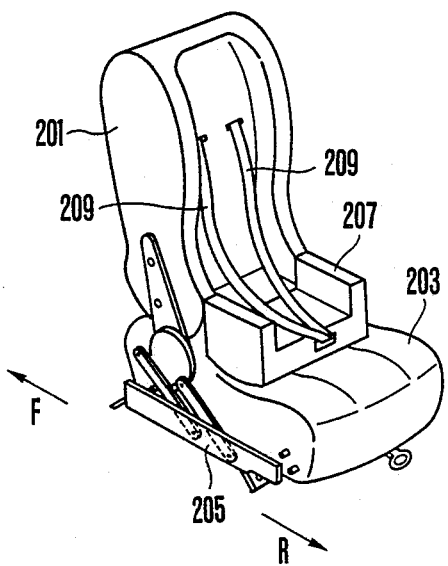
FIG. 8 a perspective view of a conventional child seat.

Thus, a seat belt anchor for a child (27) is clamped by means of the bolt (26) at the base of the portion of the back frame member (11) to which the horizontal portion(21) of the reinforcing member (2) is firmly fixed. As illustrated in FIG. 6 and FIG. 7, the seat belt (30) provided with a buckle (31) at the end thereof is fitted to the seat belt anchor (27). In FIGS. 6 to 7, reference character ($C_1$) denotes a seat back and reference character ($C_2$) denotes a seat cushion for a child, respectively. (a) denotes a seat cushion and reference character (b) denotes a seat back.

According to the embodiment as described above, the reinforcing member is constituted by employing a metallic pipe, but a plate may also be employed in lieu of the above pipe Further, when the reinforcing member is firmly fixed to the seat frame, it can also be fixed thereto by means of bolt clamping or adhesion, except welding.

Thus, the present invention as constituted above has the following effects and advantages in detail.

To the back frame member of the cushion frame to which the seat belt anchor for a child is fixed, the horizontal portion of the reinforcing member having large section modulus in the longitudinal direction is firmly fixed, and further the vertical portions of the reinforcing member having large section modulus in the vertical direction are fixed firmly to the right and left frame members of the cushion frame, thereby reinforcing the back frame member and the right and left frame members of the cushion frame.

Thus, the load applied from the seat belt is applied to the back frame member while being considerably dispersed in the longitudinal and rotating directions and on the other hand the load is applied to the right and left frame members while being considerably dispersed in the vertical direction. However, since the reinforcing member having large section modulus is firmly fixed in the direction to which the load is considerably applied, it is possible to receive the load effectively so that deformation of the cushion frame may be prevented.

Furthermore, the back frame member is constituted in concave shape in section and the horizontal portion of the reinforcing member is set within the back frame member. Still furthermore, the vertical portions of the ends of said reinforcing member are firmly fixed to the right and left frame members. Accordingly, there is no fear that the reinforcing member projects towards the inside of the cushion frame. Thus, it can prevent the spring suspendingly stretched across the cushion frame from coming into contact with the reinforcing member, causing no unpleasant sounds. Further, cushioning effect can fully be maintained.

According to the aforementioned embodiment, since a metallic pipe is employed as the reinforcing member, it is possible to constitute the same through a simple press and further the reinforcing strength thereof becomes large owing to closed section.

What is claimed is:

1. Structure of a frame of a vehicle seat provided with a child seat, comprising
    a seat belt anchor for the child seat mounted at a rear side of a seat back and firmly fixed to the frame,
    the frame comprising front frame, back frame, right and left frame members concave-shaped in section,
    a reinforcing member bent in concave shape and being fixed to the back, right, and left frame members,
    said reinforcing member having ends arranged to form substantially vertical portions firmly fixed to the respective right and left frame members and a substantially horizontal portion at the middle thereof firmly fixed to an internal surface of the back frame member, wherein the seat belt anchor is fixed to the back frame member of the frame.

2. The structure of claim 1, wherein the horizontal portion of the reinforcing member is constituted by two squashed pipes in order to firmly fix the seat belt anchor thereto.

3. The structure according to claim 1, wherein the horizontal portion and adjacent portions thereto of the reinforcing member are constituted by an outer pipe and an inner pipe arranged to be tightly and firmly inserted into the outer pipe.

4. The structure according to claim 1, wherein the reinforcing member is provided with reinforced portions constituted by an outer pipe and an inner pipe arranged to be inserted into the outer pipe, the inner and outer pipes substantially circular in cross-section and not being squashed at ends thereof in a longitudinal direction of the horizontal portion of the reinforcing member.

5. The structure according to claim 1, wherein the vertical end portions of the reinforcing member are fixed to and set within the right and left frame members in a manner such that the reinforcing member does not project towards the inside of the frame, thereby preventing a spring suspendingly stretched across the frame from coming into contact with the reinforcing member.

* * * * *